(12) United States Patent
Alder et al.

(10) Patent No.: US 7,429,065 B2
(45) Date of Patent: Sep. 30, 2008

(54) HOSE AND TUBE ASSEMBLY

(75) Inventors: Randall F. Alder, Fenton, MI (US);
Douglas J. Clemens, Stryker, OH (US);
David L. Meyer, Archbold, OH (US);
Mark R. Vogel, Sterling Heights, MI (US)

(73) Assignee: Dana Corporation, Toledo, OH (US)

( * ) Notice: Subject to any disclaimer, the term of this patent is extended or adjusted under 35 U.S.C. 154(b) by 287 days.

(21) Appl. No.: 11/448,348

(22) Filed: Jun. 6, 2006

(65) Prior Publication Data

US 2006/0226650 A1 Oct. 12, 2006

Related U.S. Application Data

(63) Continuation of application No. 10/707,675, filed on Dec. 31, 2003, now abandoned.

(51) Int. Cl.
*F16L 33/00* (2006.01)
*F16L 33/22* (2006.01)
(52) U.S. Cl. ..................... 285/259; 285/239; 285/256
(58) Field of Classification Search ............... 285/239, 285/242, 256, 259; 29/508, 515; 411/181; 403/238, 243, 280
See application file for complete search history.

(56) References Cited

U.S. PATENT DOCUMENTS

| | | | | | |
|---|---|---|---|---|---|
| 2,273,398 | A | * | 2/1942 | Couty et al. | 285/222.3 |
| 4,758,029 | A | * | 7/1988 | Davis | 285/253 |
| 5,215,339 | A | * | 6/1993 | Morse et al. | 285/256 |
| 5,261,706 | A | * | 11/1993 | Bartholomew | 285/242 |
| 5,984,376 | A | * | 11/1999 | Lampe | 285/256 |
| 6,099,045 | A | * | 8/2000 | Pirona | 285/256 |
| 7,249,787 | B1 | * | 7/2007 | Chisnell | 285/256 |

* cited by examiner

*Primary Examiner*—James M Hewitt
(74) *Attorney, Agent, or Firm*—Muncy, Geissler, Olds & Lowe PLLC

(57) ABSTRACT

An assembly includes a first member having an inner surface and a second member having an outer surface. One of the two members has greater rigidity than the other member and at least one groove. The rigid member is partially received within the less rigid member and a coupling mechanism provides radially inward pressure to generate a seal between the inner surface of the first member and the outer surface of the second member. The groove includes an opening and a base each having a predetermined width. The predetermined width of the opening is generally less than the predetermined width of the base. The more rigid member may comprise an insert with a surrounding sleeve wherein the sleeve includes the grooves.

8 Claims, 4 Drawing Sheets

HOSE AND TUBE ASSEMBLY

CROSS REFERENCE TO RELATED APPLICATIONS

This application is a continuation of Non-provisional application Ser. No. 10/707,675, filed on Dec. 31, 2003, now abandoned the contents of which are hereby incorporated by reference herein in their entirety.

TECHNICAL FIELD

The present invention relates to a hose and tube assembly, and more particularly to a hose and tube assembly wherein grooves on a surface of a first or second member receive a portion of a surface of the other member. The grooves include openings and bases of predetermined widths, such that the predetermined widths of the openings are generally less than the predetermined widths of the bases.

BACKGROUND OF THE INVENTION

Hose and tube assemblies, also referred to as fluid lines, are used to carry fluids throughout an operational environment such as that of a motor vehicle. Typical fluids carried by hose and tube assemblies include fuel, oil, transmission fluid, coolant, hydraulic fluid, or the like. Fluid lines are traditionally used in air conditioning systems, power steering systems, brake systems, or the like.

Fluid lines often include a coupling of two members having different diameters, typically a rigid tubular member coupled to a rubber hose or flexible plastic line. The coupling, among other advantages, provides flexibility to the fluid line when transporting fluids between different operational locations. The coupling of the differently sized members includes a portion of the generally smaller member, typically called a tube or male portion, being received within a portion of the larger member, typically called a hose or female portion. Accordingly, an outer surface of the smaller member engages an inner surface of the larger member. To prevent the escape of fluid at the coupling, an effective seal must be generated between the two members.

When used in an operational environment such as that seen with internal combustion engines, the seal between the two members must withstand extreme temperature changes and high internal pressures. The larger members or hoses are typically formed of a generally elastic material, such as rubber or the like. Elastic materials are typically known to expand and retract in response to temperature changes across a spectrum between cold to hot. Typically, hose and tube assemblies may experience a variation of temperature between –50° F. (–46° C.) and 350° F. (164° C.) in practice. Especially during exposure to cold temperatures elastic hoses are known to shrink. The smaller member or tube is typically made of a metal or hard rigid plastic. These rigid materials typically have much smaller rates of thermal expansion and contraction than the elastic hoses. The size variances experienced by hose and tube assemblies due to temperature changes impact the effectiveness of the seal generated at the coupling of two differently sized members.

Accordingly, a hose and tube assembly that couples two differently sized members having different materials while maintaining an effective seal when exposed to a wide temperature range is greatly desired. The assembly also must be cost effective and simple to manufacture

BRIEF SUMMARY OF THE INVENTION

The present invention is directed to an assembly comprising a first member having an inner surface and a second member having an outer surface. The second member is partially received within the first member. One of the surfaces of the members includes at least one groove for receiving a portion of the other member. The groove includes an opening and base each having a predetermined width and the predetermined width of the opening is generally less than the predetermined width of the base.

DETAILED DESCRIPTION OF THE INVENTION

Figure 1:
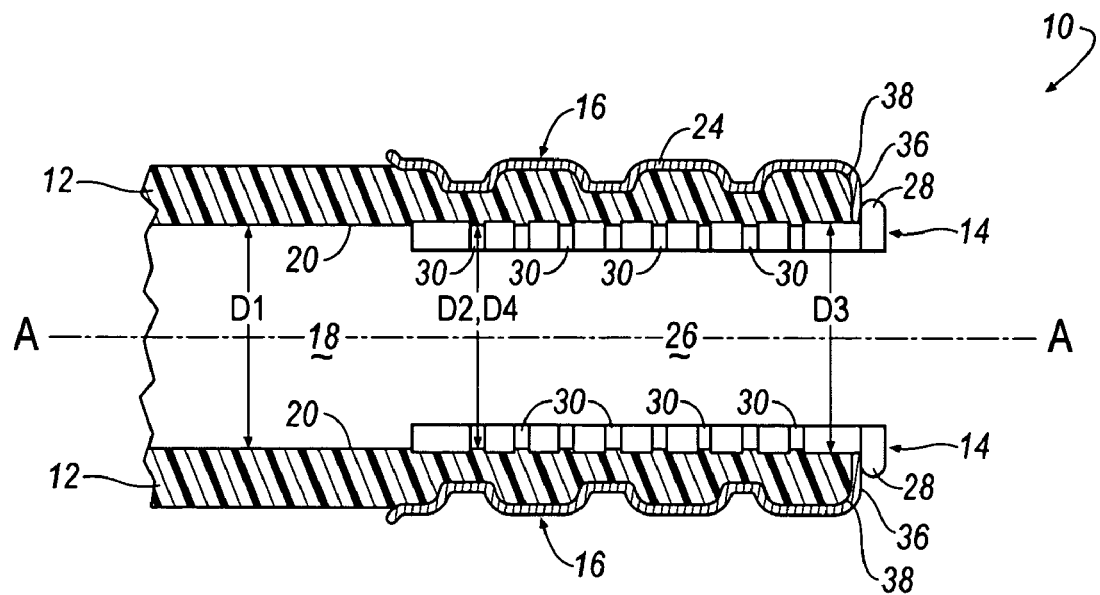
FIG. 1 is a partial cross-sectional view of an assembly of the present invention.
Figure 2:
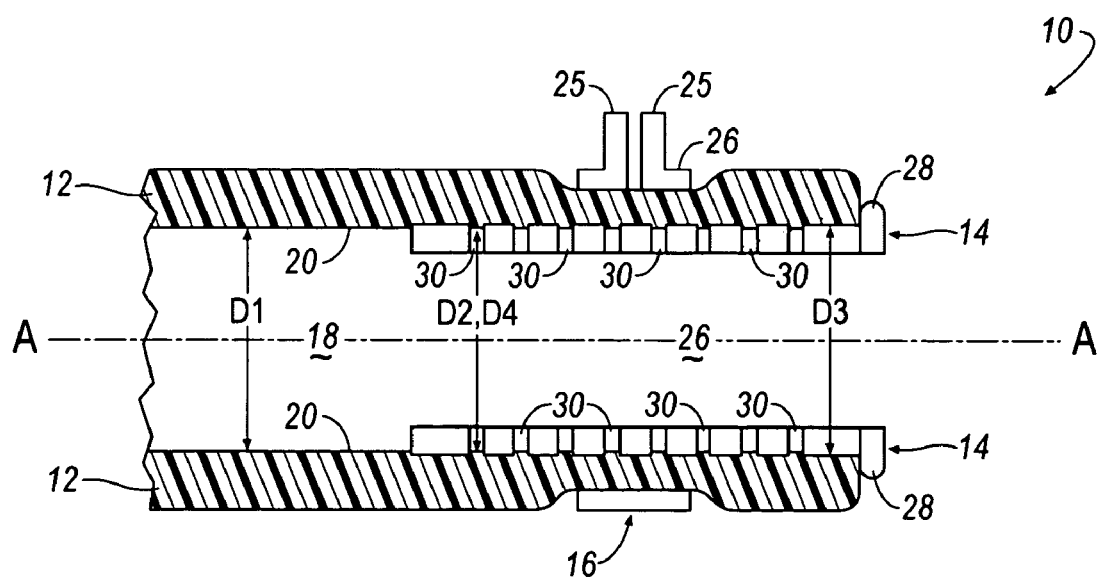
FIG. 2 is a partial cross-sectional view of the assembly of FIG. 1 having an alternative embodiment of a coupling mechanism.
Figure 3:
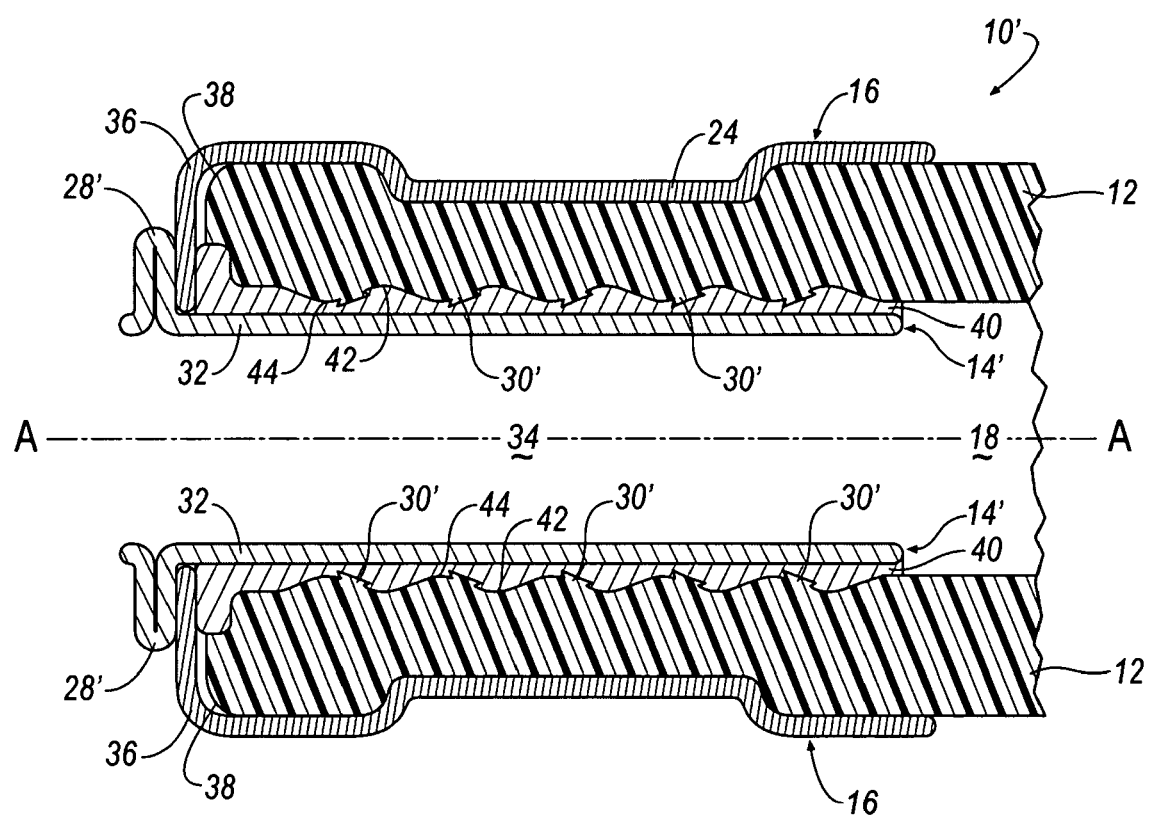
FIG. 3 is a partial cross-sectional view of an alternative embodiment of the assembly of the present invention.

Referring to FIGS. 1, 2 and 3, an assembly often referred to as a hose and tube assembly or fluid line, is generally referred to at 10. Assembly 10 includes a first member 12, or generally flexible hose acting as a female member and a second member 14 or generally rigid tube acting as a male member. Second member 14 is at least partially received in first member 12. Typically, first member 12 and second member 14 are cylindrical or tubular.

Once first member 12 and second member 14 are joined they are compressed with respect to one another to generate a seal therebetween. In the illustrated embodiments of FIGS. 1, 2 and 3, a coupling mechanism 16 is used to provide the source of compression. Both members 12, 14 are generally cylindrical in the illustrated embodiments, resulting in the application of a radial compressive force between them.

Specifically, first member 12 includes a bore 18 extending therethrough and circumscribing a central axis A-A. Bore 18 at least partially receives second member 14 of assembly 10 as an interference fit. First member 12 is typically comprised of a generally elastic material such as rubber or the like at least along and adjacent to an inner surface 20 of first member 12. Inner surface 20 defines an inner dimension D1, such as an inner diameter, when first member 12 is cylindrical. Inner dimension D1 is shown in FIG. 1 in a relaxed or non-compressed state. A second inner dimension D2 is also illustrated in FIG. 1, wherein dimension D2 is less than dimension D1. As discussed in further detail below, sufficient elastic material is required to permit appropriate compression of the elastic material between dimensions D1 and D2.

Second member 14 of the present invention includes various embodiments. The first embodiment is illustrated as an exemplary alternative in FIGS. 1 and 2, while the second exemplary alternative is illustrated in FIG. 3. As illustrated, both embodiments of second member 14 are generally cylindrical or tubular. However, second member 14 may be any component that is coupled to first member 12 and at least partially received in bore 18. By way of example, second member 14 may include a one-way valve, a quick connect component, a metal tube, or the like. Second member 14 includes a bore 26 extending therethrough and when properly connected to first member 12, bore 26 also circumscribes central axis A-A.

An outer surface 22 of second member 14 defines an outer dimension D3, such as an outer diameter of second member 14. Outer dimension D3 is preferably generally slightly less than a corresponding dimension D1 of first member 12. As a result, at least a portion of second member 14 may be received in bore 18 of first member 12 in an initial non-compressed state with inner surface 20 of first member 12 abutting outer surface 22. Alternatively, when members 12, 14 are joined by way of an interference fit, D3 may be slightly more than D1 and either D3 is compressed or D1 expands during assembly of members 12, 14 to fit the second member 14 within the first member 12. Outer surface 22 includes one or more grooves 30 extending inwardly away from outer surface 22, the base of which has a dimension D4 generally corresponding to dimension D2 when first member 12 and second member 14 are in their final locked and compressed orientation. As shown in FIG. 1, outer surface 22 includes eight grooves 30; however, any number of grooves 30 is contemplated by the present invention so long as the two members 12, 14 are appropriately secured to one another without leakage.

In contrast to first member 12, in the illustrated embodiments second member 14 is preferably generally rigid such that the application of a compressive force will not substantially change the profile of second member 14. Of course, in some embodiments it may be desirable for second member 14 to be elastic while first member 12 is generally rigid and in other embodiments it may be desirable for both members to have elasticity so long as one of the members is more rigid than the other for the reasons discussed in greater detail below. The more rigid of the members 12, 14 is the one that includes grooves 30. Typically, second member 14 is generally comprised of a rigid material such as metal or hard plastic while the first member 12 is comprised of an elastic material such as rubber or the like.

Referring to FIG. 3, in a second embodiment of hose assembly 10' second member 14' includes an insert 32 having a bore 34 extending therethrough. When received in bore 18 of first member 12, bore 34 also circumscribes central axis A-A. Second member 14' also includes a sleeve 40 that surrounds insert 32. While insert 32 is of a rigid material, such as metal, hard plastic or the like, sleeve 40 is of a generally more rigid, harder metallic material. Alternatively, sleeve 40 may be of a less rigid or softer material that facilitates easy mass manufacture of the sleeve 40. Sleeve 40 is fastened to insert 32 by processes well known in the art such as spin welding, bead locking, use of a sealant or adhesive, brazing or the like. Sleeve 40, as illustrated, includes outer surface 22' of second member 14' being generally undulated or wavy and includes a plurality of peaks 42 and valleys 44. Similar to the embodiment illustrated in FIG. 1, outer surface 22' of sleeve 40 includes at least one groove 30' extending inwardly away from outer surface 22'. As illustrated, outer surface 22' includes a plurality of grooves 30' generally positioned within the valleys 44, but somewhat offset from the lowest point of each valley 44. FIG. 3 shows sleeve 40 having five valleys 44 and five grooves 30'. However, any number of peaks 40, valleys 44 and grooves 30' is contemplated by the present invention so long as the two members 12, 14' are appropriately secured to one another without leakage.

In one preferred embodiment, grooves 30, 30' of each embodiment may be as little as generally about 1.0 millimeter wide and about 0.25 millimeters deep. Further, due to manufacturing techniques, second member 14 or generally rigid tubes typically do not have consistent circular cross-sections and are often thin. Accordingly, producing grooves 30 on outer surface 22 of second member 14 may be challenging in a mass production environment. Instead, grooves 30' of assembly 10' are typically simpler to produce in a component, such as sleeve 40 by manufacturing processes like screw machining, powdered metal, certain die casting methods or the like. Further, the generally offset grooves 30' in the valleys 44 facilitate an easier manufacture of sleeve 40. A generally angled tooling path is employed to result in grooves 30' of the desired shape explained below. Machining grooves 30' generally offset from the lowest point of valley 44 eliminates interference between the machining tool and peaks 42. Further, the mere presence of peaks 40 and valleys 44 facilitate easier assembly of first member 12 over second member 14. Edges of grooves 30' may be sharp and catch upon the inner surface 20 of the first member 12 during assembly. The peaks 40 facilitate a smooth assembly of the members 12, 14 by eliminating interference therebetween. Accordingly, in view of various mass production considerations, the second embodiment of second member 14', illustrated in FIG. 3, may be considered more efficient and effective to one skilled in the art.

When second members 14, 14' are at least partially received in first member 12, coupling mechanism 16 may be used to generate a compressive seal between inner surface 20 of first member 12 and outer surfaces 22, 22' of second members 14, 14'. In the illustrated embodiments, coupling mechanism 16 generally surrounds second members 14, 14' and first member 12 to hold and first member 12 and second members 14, 14' of assemblies 10, 10' in place.

As illustrated in FIGS. 1 and 3, coupling mechanism 16 is a crimp shell 24 or ferrule as commonly understood by one skilled in the art. Further, FIG. 2 illustrates coupling mechanism 16 as a spring clamp 26 having at least one tang 25 to secure coupling mechanism 16 about first member 12. However, coupling mechanism 16 may be any type of crimp or clamp, including a screw clamp, a spring clamp, a constant tension clamp or the like. The wide variety of coupling mechanisms 16 will be readily apparent to one skilled in the art. As such, any variety of coupling mechanisms 16 is contemplated by the present invention.

Further, each embodiment of second members 14, 14' includes a bead 28, 28' adjacent an outer end of second member 14, 14'. Beads 28, 28' projects annularly from outer surfaces 22, 22' and help to position first member 12 and coupling mechanism 16 in place. As illustrated, an end 36, 36' of coupling mechanism 16 is secured in position between beads 28, 28' and an end 38 of first member 12. Further, the inclusion of sleeve 40 more securely positions the coupling mechanism 16 between beads 28, 28' and end 38 of first member 12 by improving rigidity of the hose and tube assembly 10'.

In both embodiments coupling mechanism 16 applies pressure directed inwardly toward central axis A-A such that a portion of inner surface 20 of first member 12 is substantially forced within each of grooves 30, 30' of outer surfaces 22, 22' of second members 14, 14'. Second members 14, 14' must have sufficient rigidity so that grooves 30, 30' are not lost during the compressive process and that dimension D2 is generally equal to dimension D4. Accordingly, in a final orientation, such as that shown in FIGS. 1, 2 and 3, a seal is generated between first member 12 and second members 14, 14'.

Figure 4:
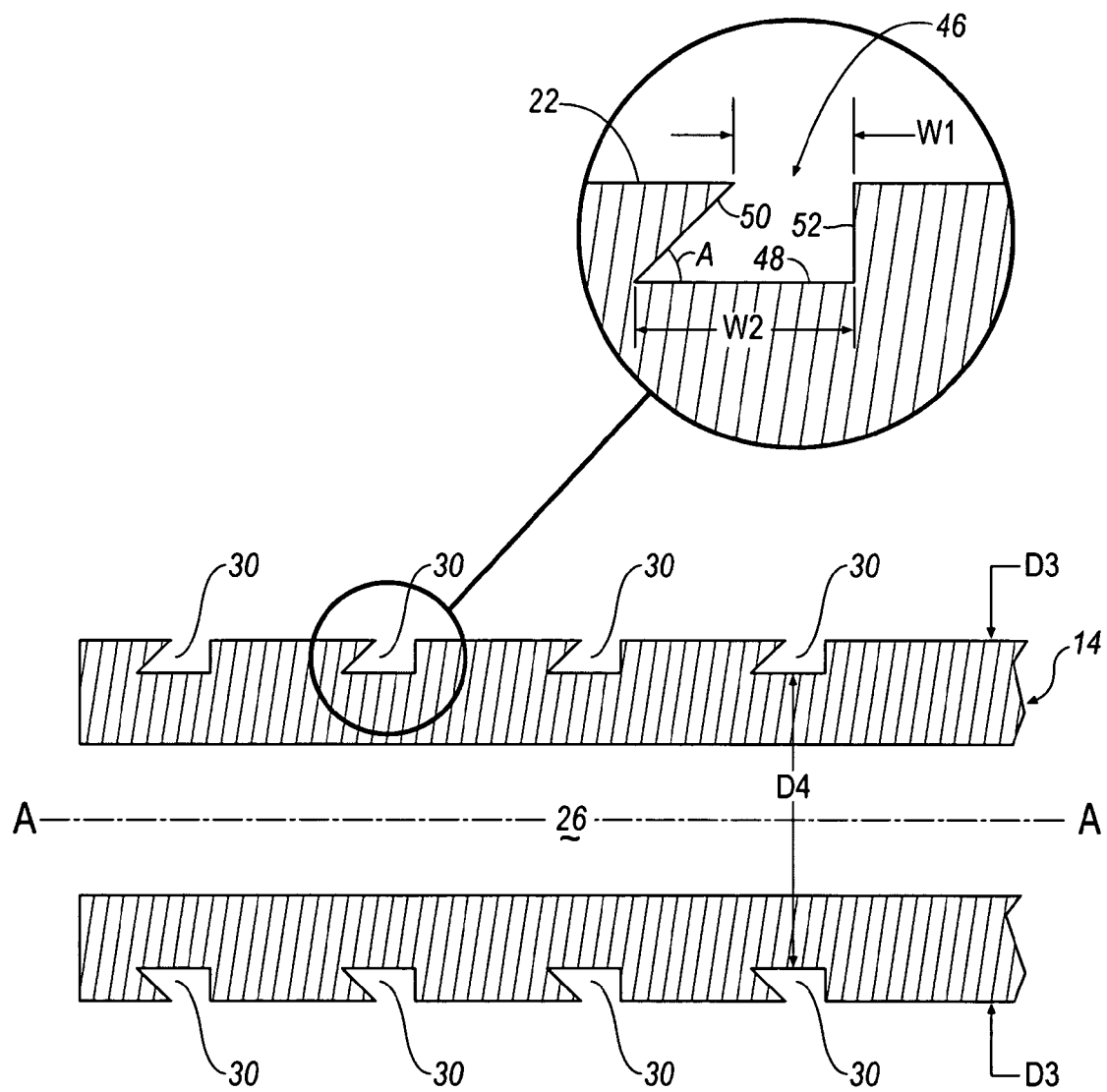
FIG. 4 is an enlarged fragmentary cross-sectional view of a second member of the present invention shown in FIG. 1.
Figure 5:
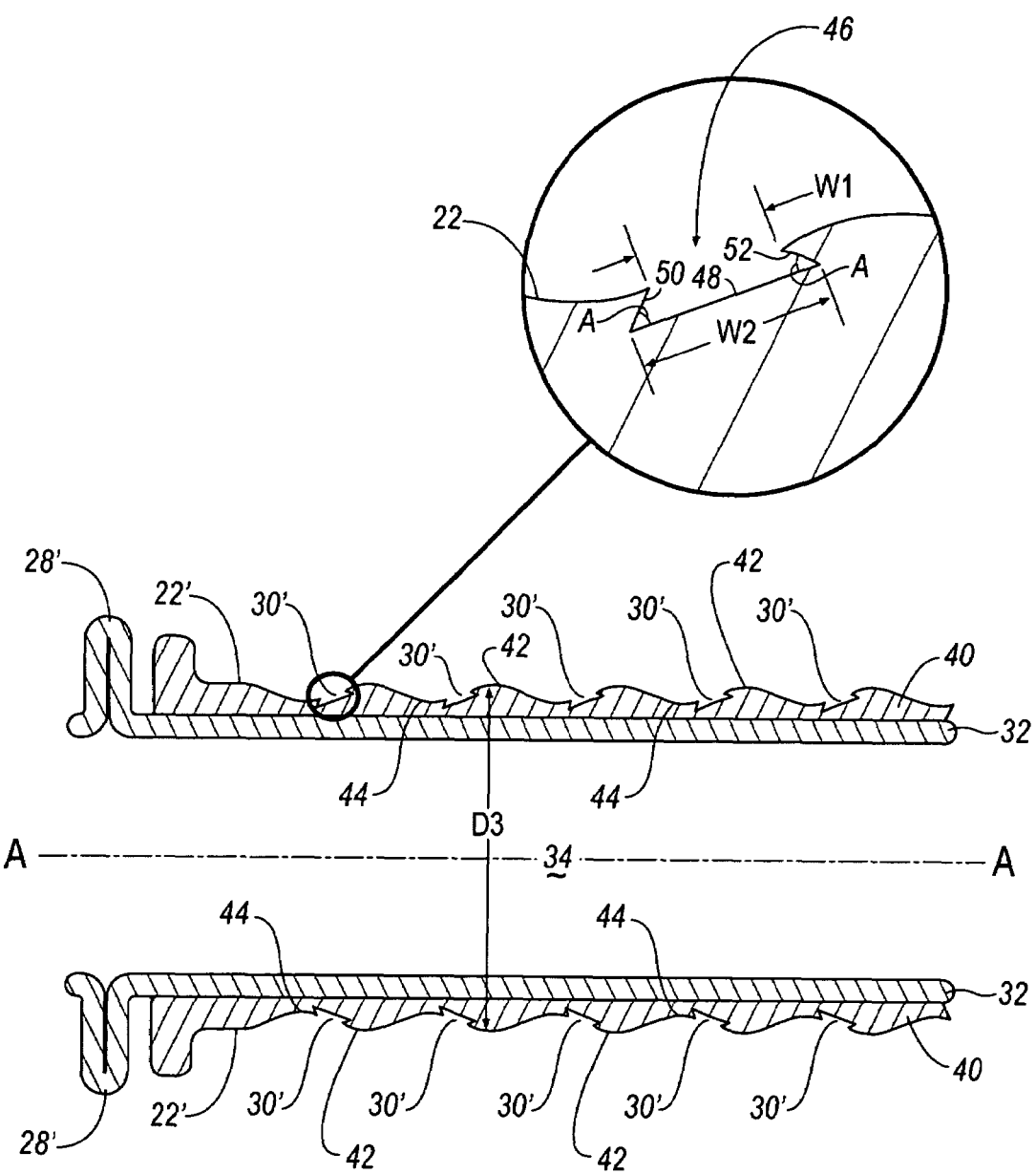
FIG. 5 is an enlarged fragmentary cross-sectional view of the second member of the present invention shown in FIG. 3.

Referring to FIGS. 4 and 5, each of grooves 30, 30' on outer surfaces 22, 22' of second members 14, 14' includes an opening 46, a base 48, a first side 50 and a second side 52. Sides 50, 52 extend from base 48 to outer surfaces 22, 22' to collectively define opening 46. Opening 46 and base 48 each include a predetermined width W1 and W2, respectively. As contemplated by the present invention, predetermined width W1 of opening 46 is generally less than predetermined width W2 of base 48. Accordingly, at least one of sides 50, 52 extends at an angle A from base 48 to outer surfaces 22, 22'. The other of sides 50, 52 may extend at angle A from base 48 to outer surfaces 22, 22' or may be generally orthogonal or obtuse to both base 48 and outer surfaces 22, 22'. As illustrated, angle A is an acute angle of about 45 degrees. However, any angle A generally less than about 90 degrees is contemplated by the present invention to result in predetermined width W1 of opening 46 being generally less than predetermined width W2 of base 48. Further, angle A of each side 50, 52 need not be the same, only less than about 90 degrees. However, in view of manufacturing considerations, having equal angles A of about 45 degrees may be desirable.

FIGS. 4 and 5 show enlarged cross-sectional views of the two alternative embodiments of second members 14, 14'. FIG. 4 illustrates side 50 being generally angled from base 48 to outer surface 22 at angle A of about 45 degrees. This embodiment of groove 30 is generally referred to by one skilled in the art as a "partial dovetail" design. Alternatively, FIG. 5 illustrates both sides 50, 52 being generally angled from base 48 to outer surface 22' at angle A of about 45 degrees. This embodiment of groove 30' is generally referred to by one skilled in the art as a "full dovetail" design. The alternative embodiments of second members 14, 14' are not intended to be limited to the specific partial or full dovetail designs. In contrast, second member 14 may incorporate a full dovetail design while second member 14' of the second embodiment may incorporate a partial dovetail design. Further, the illustration in FIG. 4 of side 50 of groove 30 being generally angled is not to be limited. As an alternative, side 52 may be angled while side 50 is orthogonal to base 48 and outer surface 22 to produce the partial dovetail design.

When the seal is generated between inner surface 20 of first member 12 and outer surfaces 22, 22' of second members 14, 14', a portion of inner surface 20 is received within grooves 30, 30'. Upon exposure to cold temperatures, the elastic material of first member 12 generally shrinks and attempts to retract from grooves 30, 30'. The wider predetermined width W2 of base 48 minimizes the effect of shrinkage by essentially locking or fixing the portion of inner surface 20 within grooves 30, 30'. Accordingly, a more effective seal is generated between first member 12 and second members 14, 14' even during exposure to cold temperatures.

It is to be understood that the above description is intended to be illustrative and not limiting. Many embodiments will be apparent to those of skill in the art upon reading the above description. Therefore, the scope of the invention should be determined, not with reference to the above description, but instead with reference to the appended claims, along with the full scope of equivalents to which such claims are entitled.

What is claimed as new and desired to be protected by Letters Patent of the United States is:

1. An assembly comprising:
    a hose member having an inner surface;
    a tubular insert at least partially received in said hose member;
    a sleeve surrounding said insert and having an outer surface;
    wherein said outer surface of said sleeve includes at least one groove for receiving a portion of said inner surface of said hose member; and
    wherein said at least one groove includes an opening and a base each having a predetermined width, said predetermined width of said opening being generally less than said predetermined width of said base.

2. An assembly, as in claim 1, wherein said outer surface of said sleeve is generally wavy having a plurality of peaks and valleys, said at least one groove being generally positioned within said valley.

3. An assembly, as in claim 1, wherein said at least one groove includes two side walls and at least one of said side walls extends angularly from said base to said outer surface to collectively define said opening.

4. An assembly, as in claim 3, wherein said at least one side wall extends angularly from said base to said outer surface at an acute angle.

5. An assembly, as in claim 3, wherein both of said two side walls extend angularly from said base to said outer surface at about 45 degrees.

6. An assembly, as in claim 1, further including a coupling mechanism providing radial inward pressure upon said hose member and said sleeve to generate a seal between said inner surface of said hose member and said outer surface of said sleeve.

7. An assembly, as in claim 6, wherein said coupling mechanism is a crimp shell.

8. An assembly, as in claim 6, wherein said coupling mechanism is a spring clamp.

* * * * *